United States Patent
Wingen et al.

(10) Patent No.: US 7,669,919 B2
(45) Date of Patent: Mar. 2, 2010

(54) ACTUATING DEVICE FOR ACTUATING A WIND DEFLECTOR DEVICE

(75) Inventors: Bernhard Wingen, Feldkirchen (DE); Thomas Pongratz, Munich (DE)

(73) Assignee: Webasto AG, Stockdorf (DE)

( * ) Notice: Subject to any disclaimer, the term of this patent is extended or adjusted under 35 U.S.C. 154(b) by 0 days.

(21) Appl. No.: 12/108,398

(22) Filed: Apr. 23, 2008

(65) Prior Publication Data

US 2008/0284212 A1 Nov. 20, 2008

(30) Foreign Application Priority Data

Apr. 24, 2007 (DE) .................. 10 2007 019 301

(51) Int. Cl.
*B60J 3/02* (2006.01)
*B60J 7/22* (2006.01)

(52) U.S. Cl. ........................ 296/214; 296/217
(58) Field of Classification Search .......... 296/214, 296/217
See application file for complete search history.

(56) References Cited

U.S. PATENT DOCUMENTS 6,082,812 A * 7/2000 Lenkens et al. ............ 296/214
6,491,340 B2 * 12/2002 Hori et al. ................. 296/214

FOREIGN PATENT DOCUMENTS

| DE | 3825192 | * | 2/1990 |
| DE | 19714492 | | 10/1998 |
| DE | 10332945 | | 2/2005 |
| EP | 0919415 | | 6/1999 |

\* cited by examiner

*Primary Examiner*—Dennis H Pedder
(74) *Attorney, Agent, or Firm*—Fitch, Even, Tabin & Flannery; John M. Naber

(57) ABSTRACT

The present invention provides an actuating device for a wind deflector device in a vehicle, with a roof opening and a roof closure element, wherein the actuating device has at least one actuating cable which can be coupled to a sun-shielding device, wherein the actuating cable can actuate the sun-shielding device when it is coupled to the sun-shielding device, wherein the actuating cable can be moved in a first direction in which the sun-shielding device uncovers the roof opening, wherein the actuating cable can be decoupled from the sun-shielding device in a predetermined position, and wherein, in the state in which it is decoupled from the sun-shielding device, the actuating cable can be moved further in the first direction and, in the process, can adjust the wind deflector device.

11 Claims, 11 Drawing Sheets

ACTUATING DEVICE FOR ACTUATING A WIND DEFLECTOR DEVICE

This invention relates to and claims the benefit of priority from application no. DE 10 2007 019 301.9, filed on Apr. 24, 2007.

The present invention relates to an actuating device for a wind deflector in a vehicle roof with a displaceable cover. In this case, the displaceable cover may optionally completely or at least partially open or close a roof opening in the vehicle.

A wind deflector for vehicle roofs generally has the function of improving the flow conditions when the displaceable cover is moved into an open position. In this case, the wind deflector serves, inter alia, to prevent or at least to reduce the occurrence of annoying wind noises, such as whistling noises and the like. For this purpose, the wind deflector can be moved into a corresponding position, for example as a function of the vehicle speed, in order to prevent or to reduce such wind noises.

An open vehicle roof structure with a displaceable covering is known from the prior art, as described in EP 0 919 415. In this case, in addition to the displaceable covering, a wind deflector and a sunshield are also provided. In order to actuate the wind deflector, a driving device of the sunshield is combined with a drive of the wind deflector. The adjustment of the wind deflector is undertaken when the sunshield is moved into the closed position in which it opens up the roof opening such that light can pass through the roof opening into the vehicle interior. In this case, the driving cable of the sunshield is connected to that of the wind deflector, with a relatively small movement of the sunshield bringing about an adjustment of the wind deflector.

Furthermore, an actuating device for a wind deflector in a vehicle sliding roof is known from DE 197 14 492. In this case, a driver comes into engagement with a pivoting mechanism of the wind deflector and pivots the latter into different positions.

Furthermore, a sliding roof for a motor vehicle is known from DE 103 32 945, in which the adjustment of the roller blind and of the wind deflector takes place by means of the same driving device. In this case, both the roller blind and the wind deflector are in engagement with corresponding driving cables which are controlled via a gearwheel and an electric motor, which is connected thereto, as the driving device. However, in this case, the driving cables are never simultaneously connected to the roller blind and to the wind deflector.

By rotation of the gearwheel of the driving device counterclockwise, the driving cables are brought into engagement with the driving elements of the roller blind while, when the gearwheel is rotated in the clockwise direction, the driving cables are brought into engagement with the driving elements of the wind deflector in order to adjust the latter.

It is the object of the invention to provide, for a wind deflector device, an actuating device, in which an actuating cable can be used both for actuating the wind deflector device and for actuating a sun-shielding device, such as, for example, a roller blind or a sliding roof lining, wherein the actuating cable can be actuated in a simple manner.

This object is achieved by an actuating device for a wind deflector device in a vehicle with a roof opening and a roof closure element, wherein the actuating device has at least one actuating cable which can be coupled to a sun-shielding device,
wherein the actuating cable can actuate the sun-shielding device when it is coupled to the sun-shielding device,
wherein the actuating cable can be moved in a first direction in which the sun-shielding device uncovers the roof opening, wherein the actuating cable can be decoupled from the sun-shielding device in a predetermined position, and
wherein, in the state in which it is decoupled from the sun-shielding device, the actuating cable can be moved further in the first direction and, in the process, can adjust the wind deflector device.

An actuating device of this type has the advantage that the sun-shielding device and the wind deflector device can be actuated in a very simple manner, independently of the actuation of the sliding roof. In this case, the direction of movement of the actuating cable does not have to be changed in order, firstly, to move the sun-shielding device into a position in which the roof opening is uncovered and, secondly, the wind deflector device can be erected. Furthermore, the actuating cable, by being decoupled from the sun-shielding device, can be used as an independent cable for actuating the wind deflector device.

Further refinements of the invention are explained in the subclaims.

In one embodiment of the invention, the sun-shielding device is in each case connected on one or both sides to a slider arrangement which is arranged displaceably in an associated guide rail. In this case, the actuating cable can be coupled to the slider arrangement. This has the advantage that the actuating cable, firstly, can thereby be temporarily and reliably connected to the sun-shielding device in order to actuate the latter and, secondly, can be completely released again from the latter in order to be available to actuate different devices, such as the wind deflector device.

In a further embodiment, the slider arrangement has a slider element, with a locking element being movably accommodated in the slider element. In this case, the locking element can latch in place in at least one cutout in the guide rail. The cutout here can be arranged in such a manner that the sun-shielding device is fixed in an end position in which it essentially completely uncovers the roof opening and can penetrate unhindered into the passenger compartment. This has the advantage that, for example, a position of the sun-shielding device can be secured and fixed in a very simple manner by the formation of the sliding arrangement with the latching-in-place function.

According to a further embodiment according to the invention, the locking element and the sliding element have a channel into which the actuating cable can be introduced and can be coupled to the sliding arrangement. In this case, the channel in the locking element can be of downwardly inclined design in such a manner that, when the actuating cable is introduced into the channel in order to be coupled to the sun-shielding device, the actuating element can be reliably held in the depression by means of a projection such that it does not slip out inadvertently. A further advantage is that, for the coupling into the slider arrangement, the actuating cable can very simply release the locking element from its latching in the cutout of the guide rail.

The invention is explained in more detail below using an exemplary embodiment and with reference to the attached figures of the drawing, in which.

Figure 1:
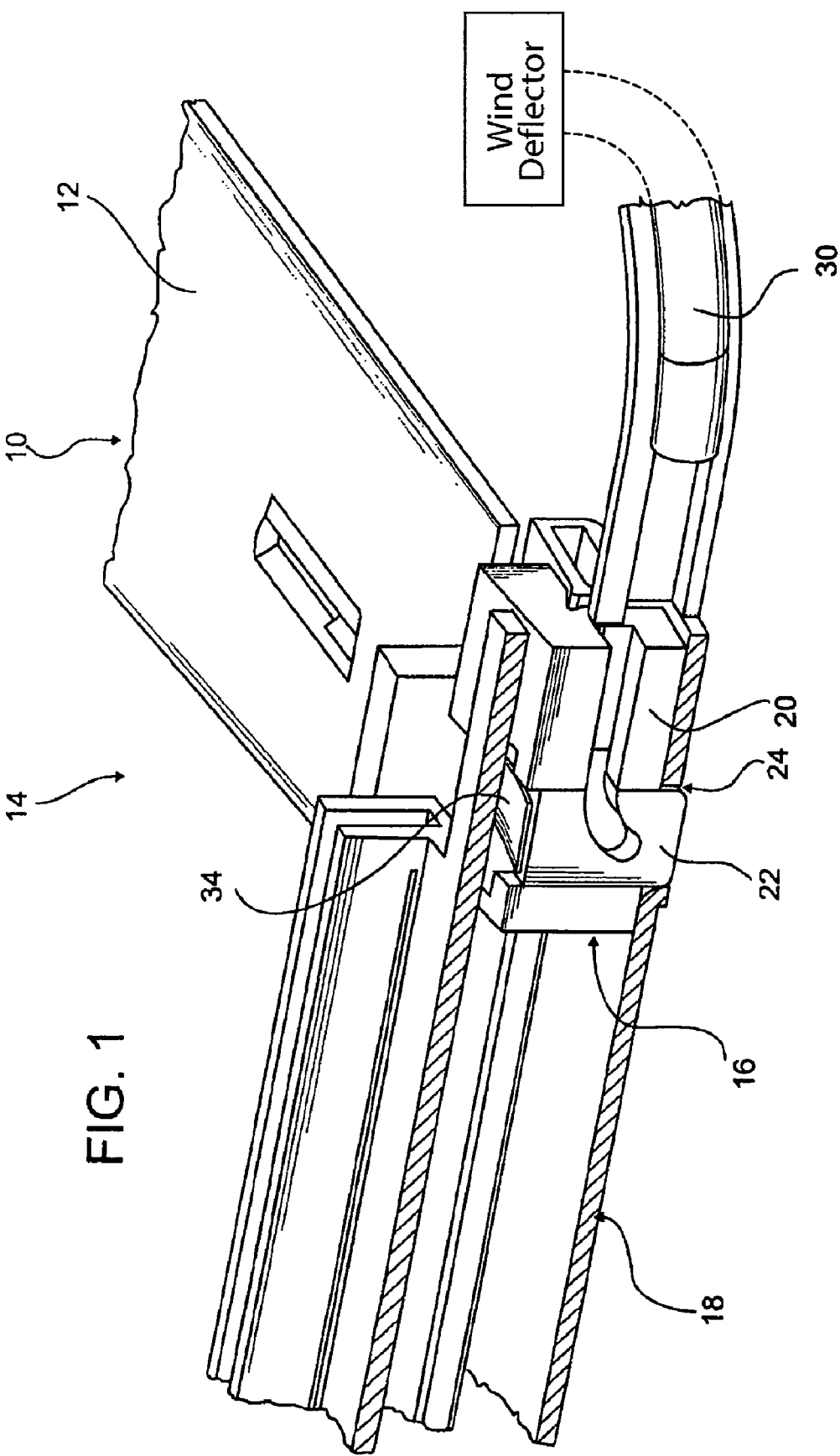
FIG. 1 shows a roller blind bow, which is connected to a roller blind, and an actuating cable, in an uncoupled state.

The sun-shielding device 10 shown in FIG. 1 is a roller blind (not illustrated) with a roller blind bow 12. The sun-shielding device 10 normally serves, in the case of a vehicle with a roof opening 14 having a sliding roof as the roof closure element, to either release the roof opening 14 such that light can penetrate through the roof opening 14 or the sliding roof (normally made of glass), or to cover the roof opening 14 such that a driver is protected from excessively strong insulation.

The sun-shielding device 10 in the form, for example, of a roller blind or a sliding roof lining can be correspondingly moved or pulled forward in order to completely or partially cover the roof opening 14, or can be moved back in order to release the roof opening 14.

The sun-shielding device 10, such as the roller blind here, can be actuated, for example, electrically via a driving device and/or also manually. In this case, the roller blind can be designed in a manner such that it can be actuated, for example, as a function of or else independently of the sliding roof. Instead of a roller blind, it is also possible, as previously described, for, for example, a displaceable sliding roof lining (not illustrated) to be used.

The present embodiment is described in more detail with reference to a roller blind as the sun-shielding device 10, but can be correspondingly applied in just the same way to a sliding roof lining. The functioning principle, as is explained below, remains the same.

The roller blind bow 12 and the roller blind fastened to it are moved via a slider arrangement 16 in a guide rail 18 in the vehicle roof. In this case, the slider arrangement 16 comprises a slider element 20 within which at least one locking element 22 is movably arranged. Furthermore, at least one cutout 24, into which the locking element 22 of the slider arrangement 16 can latch in place, is provided in the guide rail 18. A channel 26, 28, in which an actuating cable 30 can be accommodated, is provided in the locking element 22 and the slider element 20. For this purpose, the actuating cable 30 has, for example on its end piece, a control lug with a projection 32 which can be accommodated and guided in the channel 26, 28.

In the illustration in FIG. 1, the actuating cable 30 is decoupled and separated from the slider element 16. As a result, the actuating cable 30 can be moved further in a first direction via a driving device and/or manually, for example via a crank. For this purpose, a lateral slot in a frame part adjoins the guide rail 18, for example as a guide for the actuating cable 30. In this case, the actuating cable 30 can be coupled, for example, to the wind deflector device or to a slotted guide of the wind deflector device. However, the actuating cable 30 may alternatively also be connected fixedly to the wind deflector device in order to adjust the latter.

The wind deflector device, which can be erected vertically in one or more positions in order, for example, to damp wind noises, can be adjusted by means of the actuating cable 30. For this purpose, it is conceivable, for example, for the actuating cable 30, after being decoupled from the slider arrangement 16 of the roller blind bow 12, to be able to be coupled to the wind deflector device in order to additionally change the latter, for example, in its position. For example, the actuating cable 30 can be coupled to the wind deflector device such that it can actuate the wind deflector device in such a manner that the position of the wind deflector device is changed, for example by the wind deflector device being erected higher, in order to better suppress wind noises. In this case, the wind deflector device can have its own driving device and can be additionally adjusted via the actuating cable 30 such that different positions or adjustment angles can be realized. As an alternative, however, the wind deflector device can also only be adjusted via the actuating cable in order to suitably reduce wind noises or to prevent the occurrence thereof.

The guide rail 18 is shown in a partial sectional view in FIGS. 1 to 10 in order to show the arrangement of the slider arrangement 16, the locking element 22 and the actuating cable 30 within the guide rail 18. Such a guide rail 18 and the slider arrangement 16 belonging thereto, and also the actuating cable 30, can be arranged on one or both sides of the roller blind.

In the pulled-back position of the roller blind bow 12 or of the roller blind and the slider arrangement 16, in which position the roller blind, for example, completely uncovers the roof opening 14 of the vehicle, the locking element 22 is latched in place in the cutout 24 on the lower side of the guide rail 18. The slider arrangement 16 can optionally additionally have a spring element 34 via which the locking element 22 can be pressed into the cutout 24 and via which the locking element 22 can also be held in the cutout 24. In principle, however, the locking element 22 is also moved into the cutout 24 of the guide rail 18 and held there only via gravity.

Figure 2:
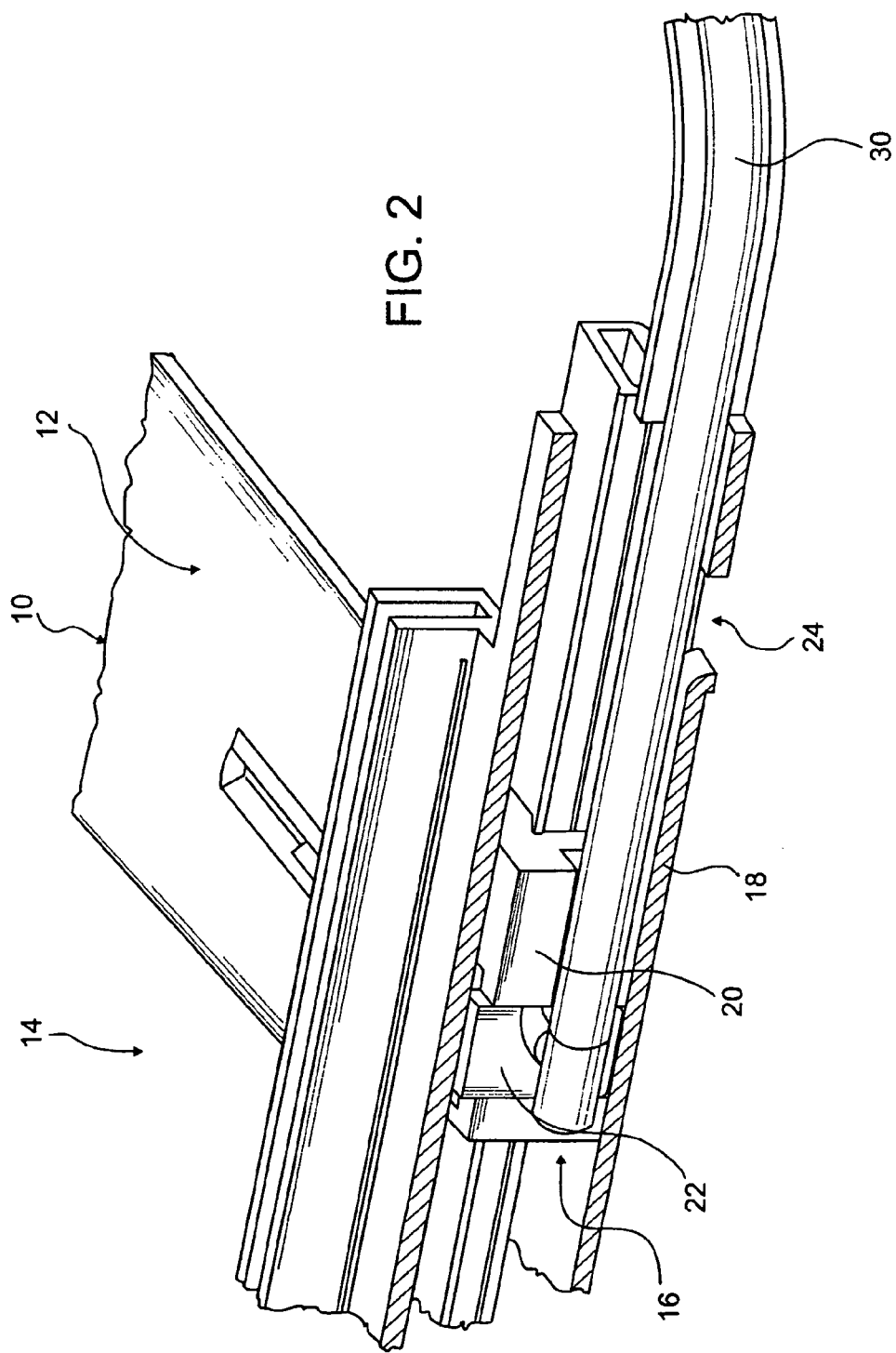
FIG. 2 shows the roller blind bow and the actuating cable according to FIG. 1 in a coupled state, with the roller blind bow being in a position in which a roof opening of a vehicle is at least partially concealed by the roller blind connected to the roller blind bow.

In contrast to FIG. 1, in FIG. 2, the roller blind bow 12 and the roller blind are coupled or connected to the actuating cable 30. In this case, the roller blind bow 12 and the roller blind connected thereto are in a position in which the roof opening 14 of the vehicle (not illustrated) is at least partially covered by the roller blind such that insulation is reduced. In this case, the roller blind bow 12 and the roller blind are in a position in which they are pulled forward. The actuating cable 30 is held or "latched in place" in a channel 28 of the locking element 22 by means of its projection 32, as a result of the fact that the channel 28 is inclined downward. This is shown, in particular, in FIG. 11 which will be discussed further below. The inclination of the channel 28 gives rise here to a type of latchingin-place function, in the sense that the actuating cable 30 is held in the locking element 22 or the slider arrangement 16 when the actuating cable 30 is moved in a first direction in which the roller blind is moved into a position in which the roof opening is uncovered. In principle, however, other latching-in-place embodiments which prevent an inadvertent slipping of the actuating cable 30 out of the channel 26, 28 are also conceivable.

Figure 3:
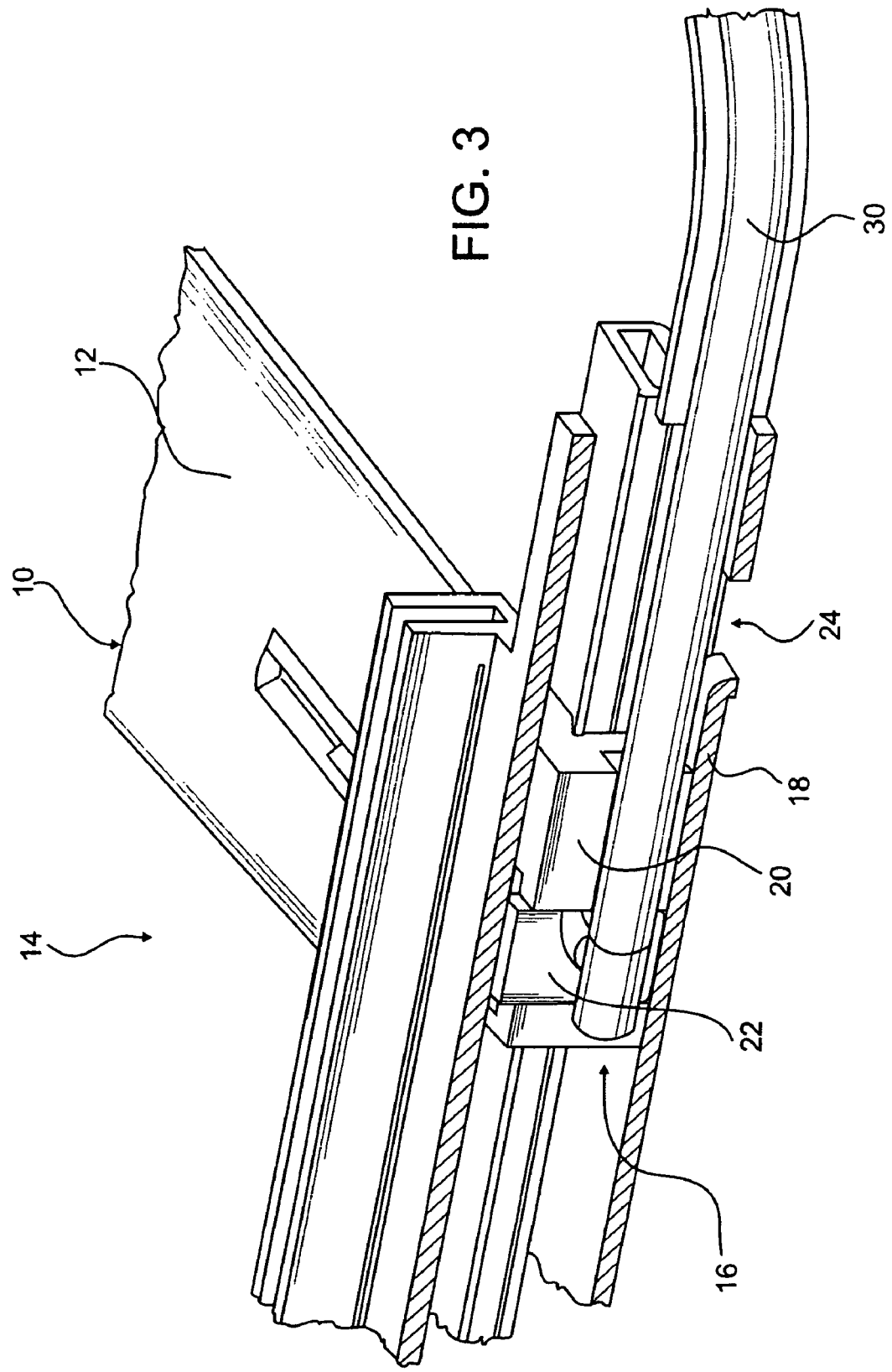
FIG. 3 shows the roller blind bow according to FIG. 2, with the roller blind bow and the actuating cable which is coupled to it being partially pulled back in order to make the roof opening of the vehicle free such that light can penetrate through the roof opening into the passenger compartment.
Figure 4:
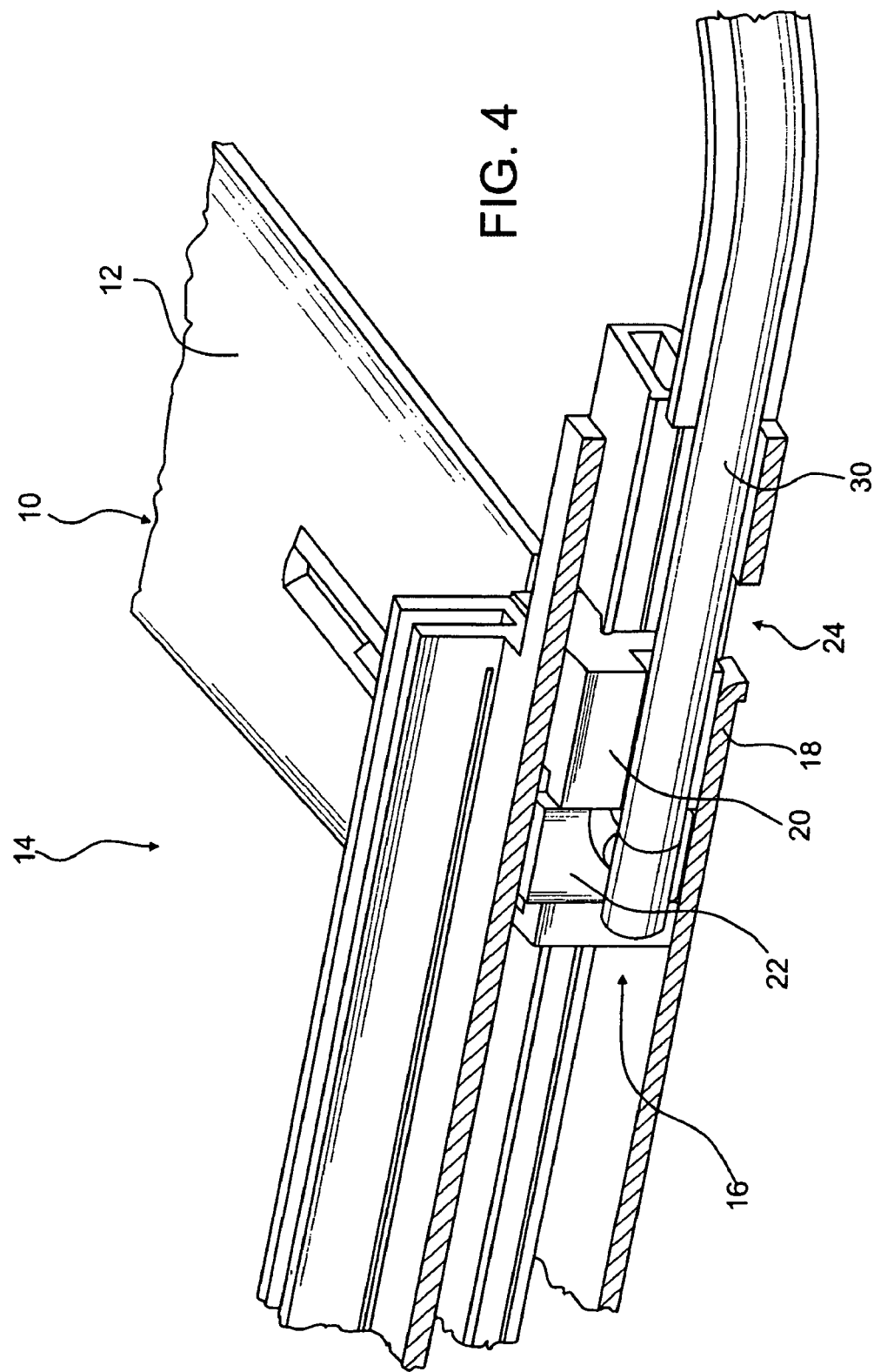
FIG. 4 shows the roller blind bow according to FIG. 3, with the roller blind bow and the actuating cable coupled to it being pulled back further.

FIG. 3 shows the roller blind bow 12 and the actuating cable 30, which is coupled or connected to the slider arrangement 16, in a position in which they are pulled back further. In FIG. 4, the roller blind bow 12 and the actuating cable 30 which is coupled thereto are pulled back even further.

Figure 5:
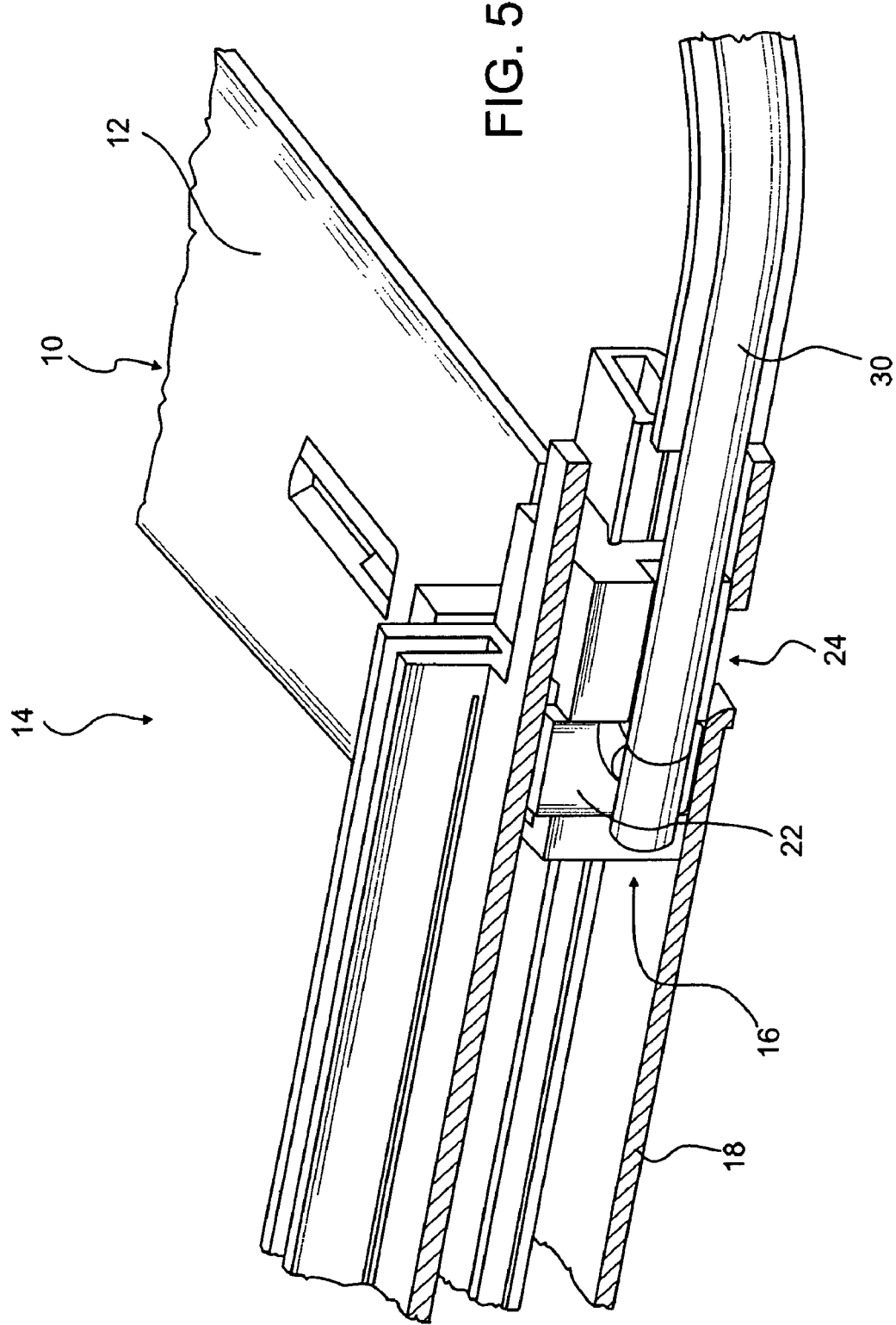
FIG. 5 shows the roller blind bow according to FIG. 4, with the roller blind bow and the actuating cable coupled to it being pulled back even further.
Figure 6:
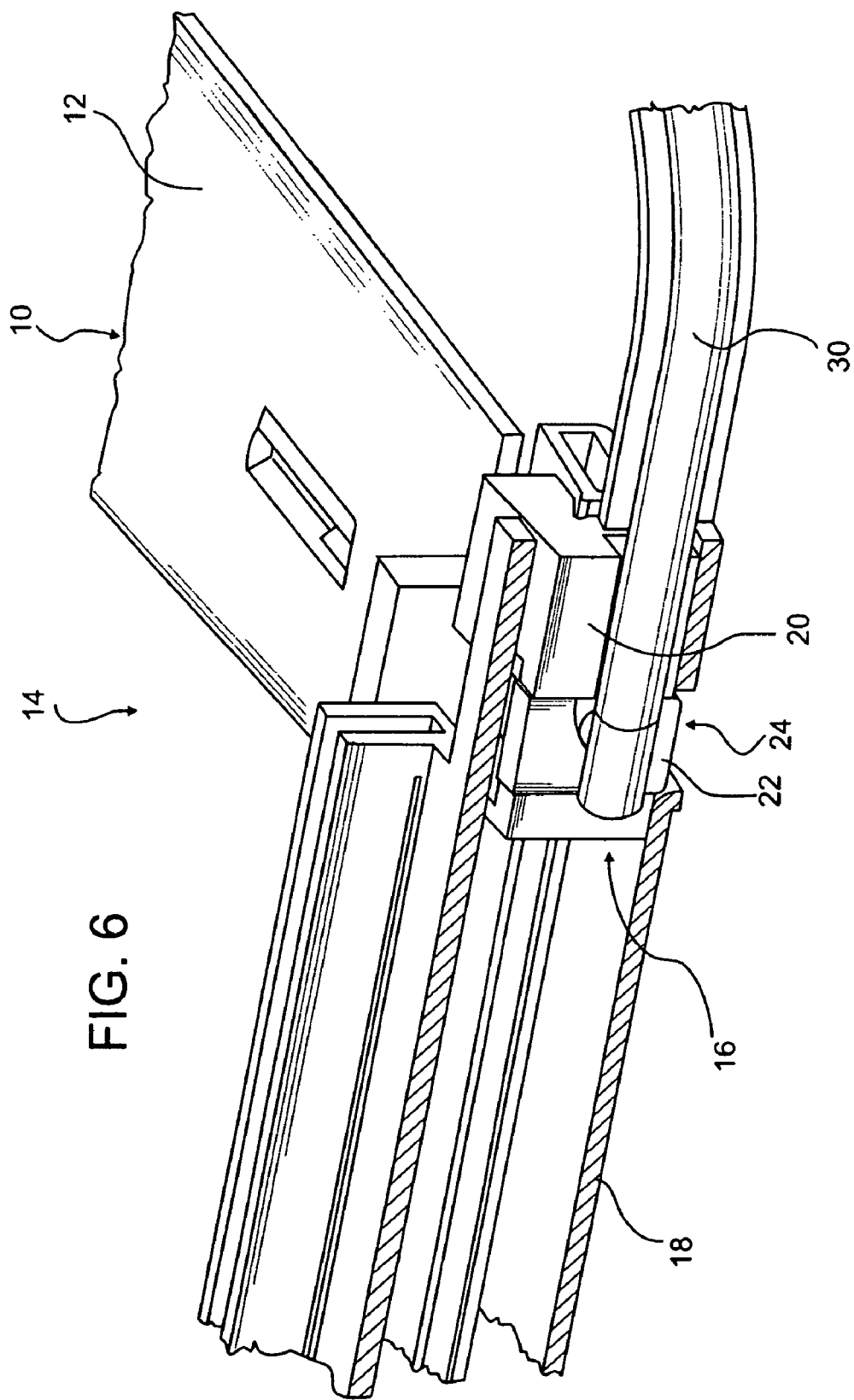
FIG. 6 shows the roller blind bow according to FIG. 5, with the roller blind bow and the actuating cable coupled to it being pulled back as far as an end position in which the roof opening is completely opened up and the actuating cable therefore begins to be released from its coupled position.
Figure 7:
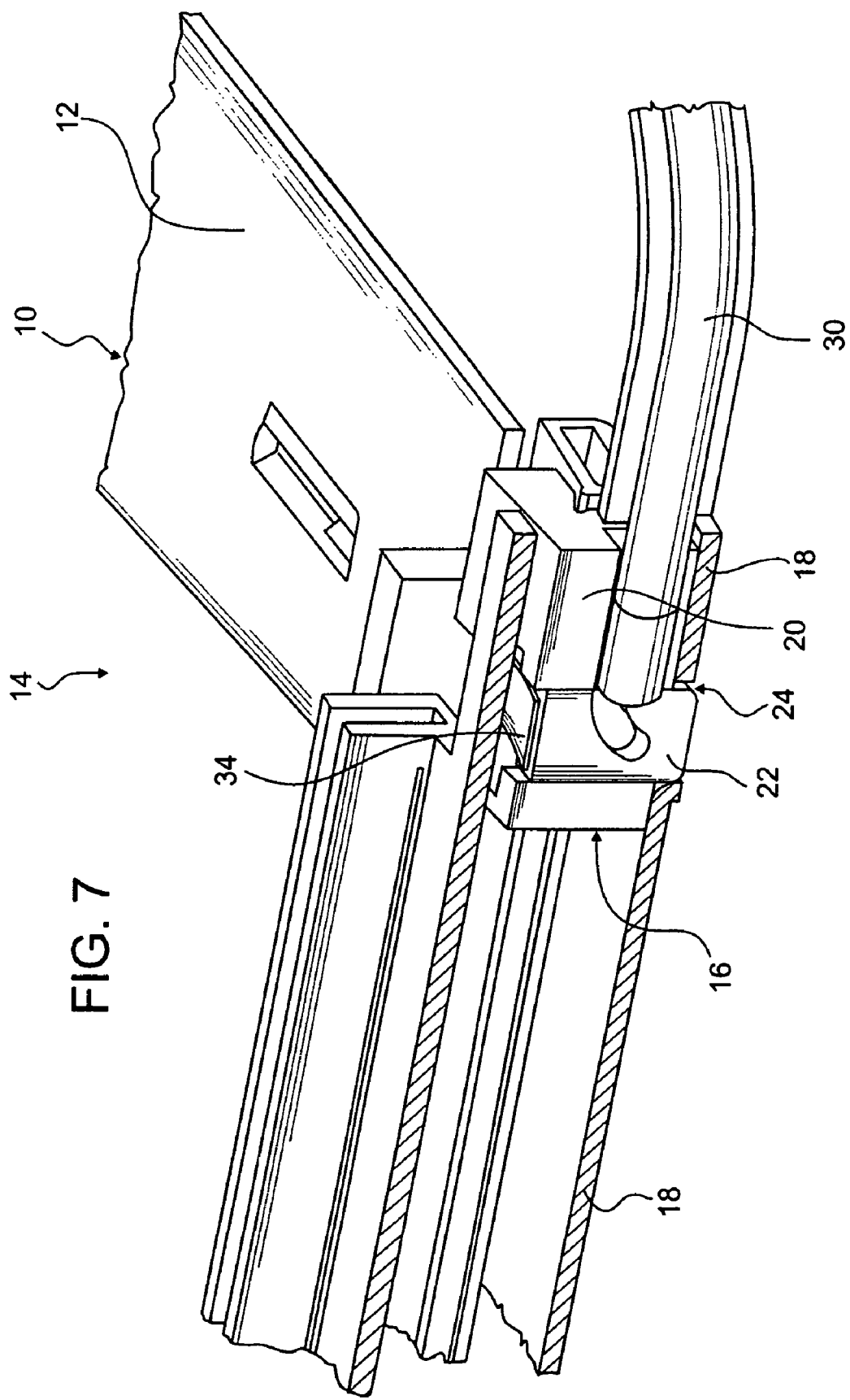
FIG. 7 shows the roller blind bow according to FIG. 6 in a position in which it is latched in place, with the actuating cable having been released from its coupled position.

In FIG. 5, the roller blind bow 12 and the slider arrangement 16 and also the actuating cable 30 which is coupled to the slider arrangement 16 are pulled back to such an extent that the slider element 20 of the slider arrangement 16 reaches the cutout 24 in the guide rail 16. In this case, the slider element 20 slides beyond the cutout 24. By contrast, as shown in FIG. 6, the movable locking element 22 latches in place in the cutout 24 of the guide rail 18 when the roller blind bow 12 and the slider arrangement 16 connected to it are pulled back further or moved in the first direction. The cutout 24 here can be positioned in the guide rail 18, for example in such a manner that the roller blind bow 12 and the roller blind connected to it reach an end position in which the roller blind is completely pulled back and the roof opening of the vehicle is entirely uncovered.

In this case, the locking element 22 is moved or pressed downward by the spring element 34 into the cutout 24 and is also held there preferably by means of the spring element 34. As an alternative, it is also conceivable, in this connection, for the cutout 24 not to be provided on the lower side of the guide rail 18, but rather, for example, on the upper side, with the spring element 34 in this case being designed and arranged in such a manner that it correspondingly presses the locking element 22 upward and also holds it there. In principle, the cutout 24 can also be arranged laterally in the guide rail 18, and the spring element 34 can likewise be correspondingly positioned in such a manner that it presses the locking element 22 into the cutout 24 and holds it there.

Figure 8:
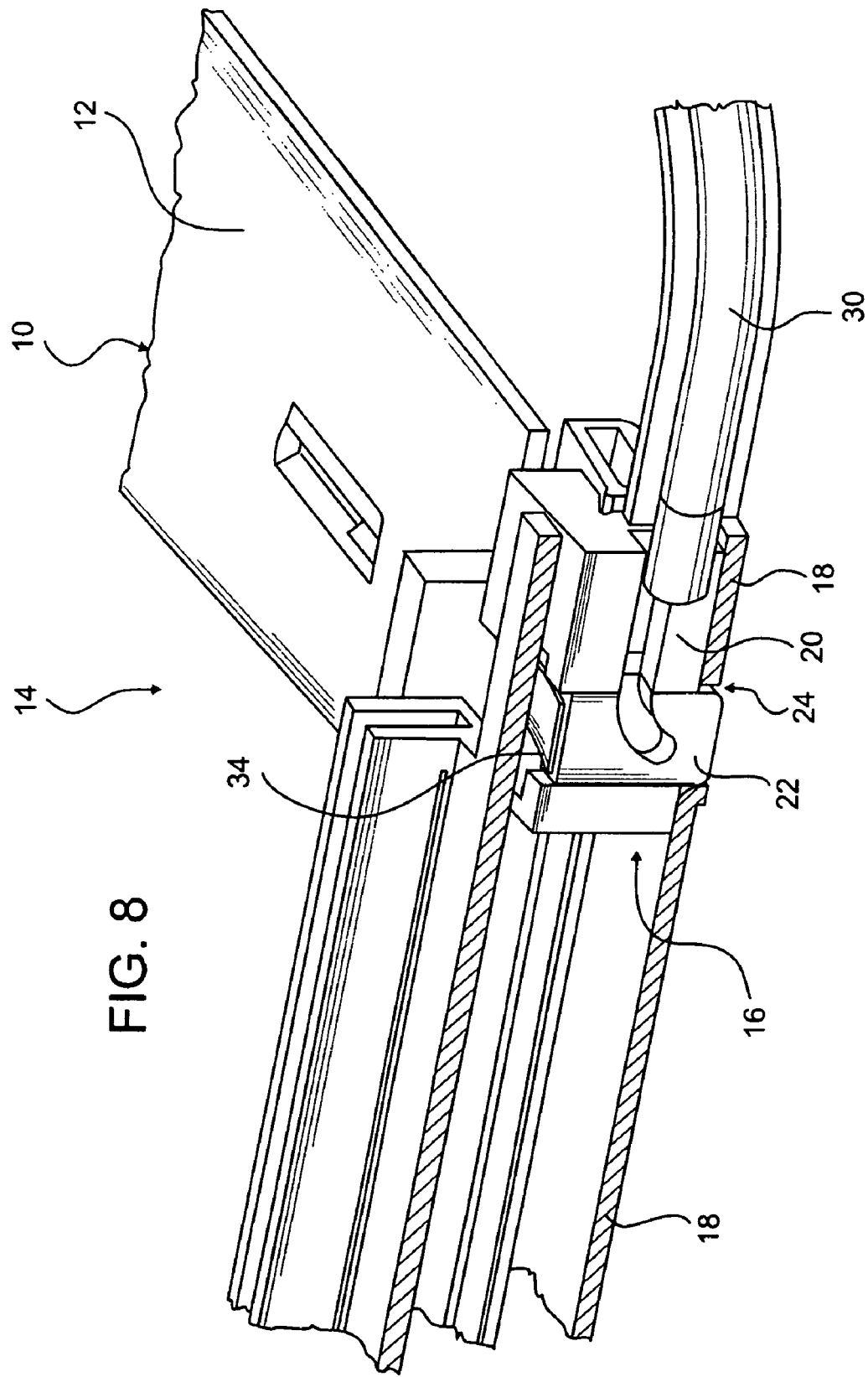
FIG. 8 shows the roller blind bow and the actuating cable according to FIG. 7, with the actuating cable having been completely released from its coupled position.
Figure 9:
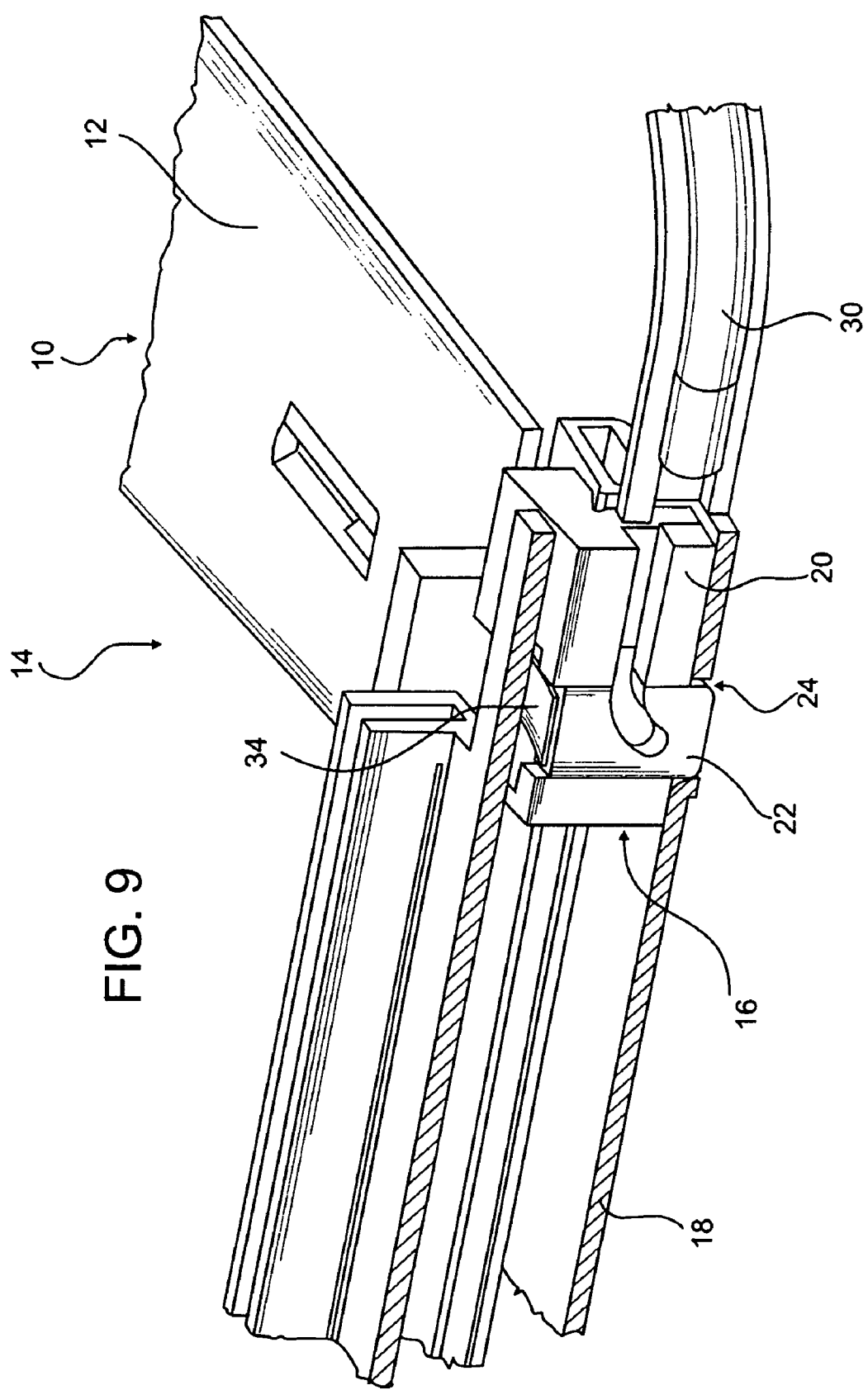
FIG. 9 shows the roller blind bow and the actuating cable according to FIG. 8, with the actuating cable having been completely uncoupled from the roller blind bow and being moved further toward a wind deflector device.
Figure 10:
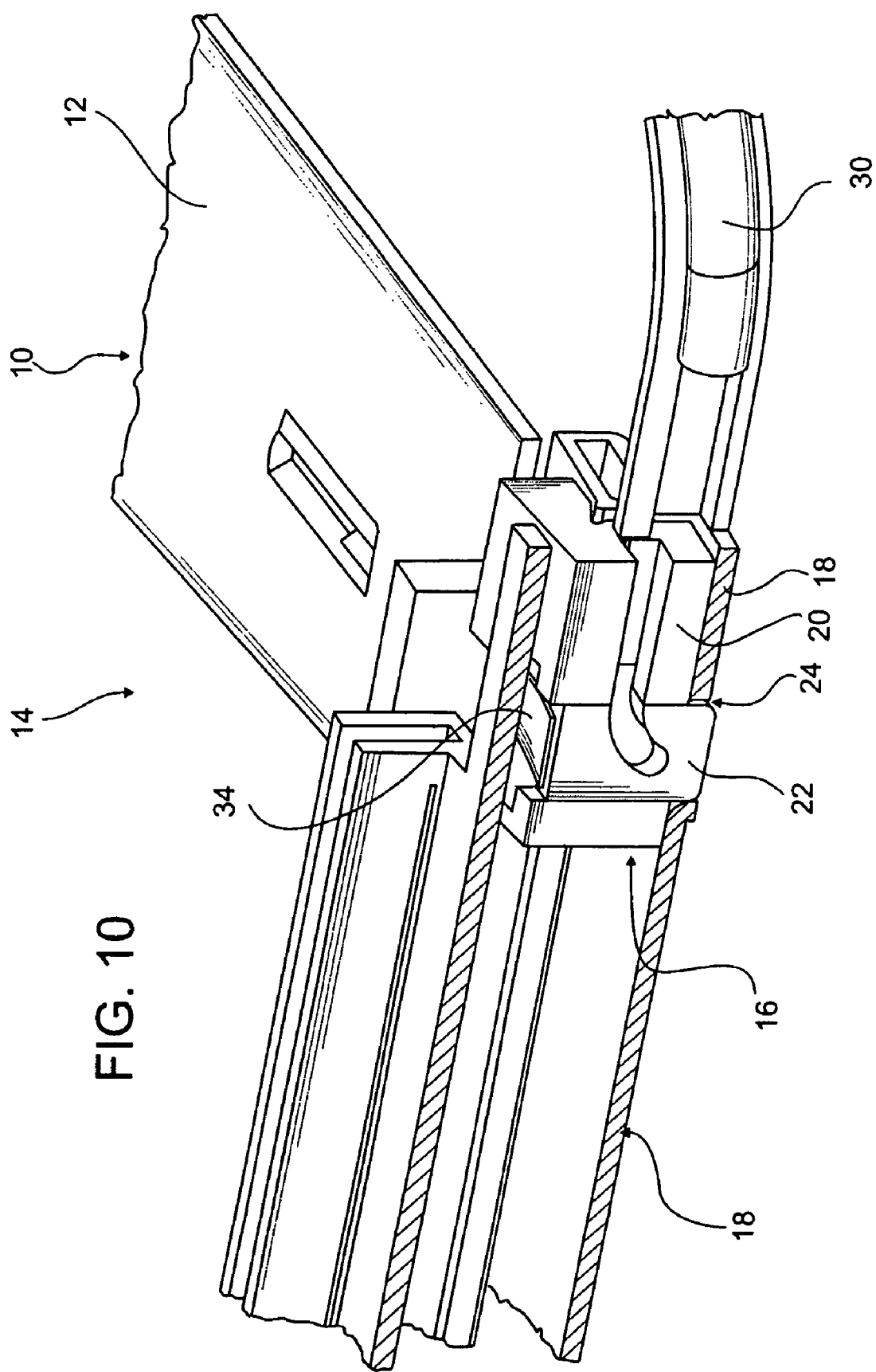
FIG. 10 shows the roller blind bow and the actuating cable according to FIG. 9, with the actuating cable being moved further toward the wind deflector device.

As soon as the locking element 22 is accommodated in the cutout 24 of the guide rail 18, the slider arrangement 16 and the roller blind bow 12, and also the roller blind connected thereto, cannot be moved back further in the first direction. By contrast, the actuating cable 30 can be pulled back further or can be moved away from the slider arrangement 16. In this case, the actuating cable 30 can be released from the locking element 22 or can be pulled out of the depression thereof and can therefore be uncoupled from said locking element. The actuating cable 30 can be moved further out of the channel 28 of the sliding element 20 or, as illustrated in FIGS. 8, 9 and 10, can be moved completely out of the slider arrangement 16. In this case, the actuating cable 30 can be moved further while the locking element 22 fixes the slider arrangement 16 in a predetermined position.

The actuating cable 30 can be moved here to the wind deflector device and can be coupled or brought into engagement therewith, with it being possible for the wind deflector device to be changed in its position or its adjustment angle by means of the actuating cable 30. For example, it is conceivable for the wind deflector device to be erected further vertically. In this case, the wind deflector device can have a separate adjusting device in order to set the erection angle. The actuating cable 30 here can act as an additional support and can bring about an even higher or a different erection of the wind deflector device than is possible or expedient by means of the adjusting device. However, it is alternatively also conceivable for the wind deflector device, instead of being positioned additionally via the actuating cable 30, to be positioned and adjusted exclusively via the actuating cable 30.

In principle, the actuating cable 30 may also be connected, for example, fixedly to the wind deflector device provided that a suitable adjustment of the wind deflector device can be ensured.

In order to again cover the roof opening 14 by means of the roller blind so as to prevent excessively strong insulation, the actuating cable 30 is again moved forward counter to the first direction.

In this case, the actuating cable 30 is inserted again into the channel 26, 28 of the slider arrangement 16. In this connection, the actuating cable 30 can be pushed through the channel 26 of the slider element 20 into the channel 28 of the locking element 22. The downwardly inclined design of the channel 28 of the locking element 22 causes the actuating cable 30 to press the locking element 22 upward or out of the cutout 24 of the guide rail 18 counter to the force of the spring element 34. As a result, the actuating cable 30, which is again coupled here to the slider arrangement 16, makes it possible for the slider arrangement 16 of the roller blind bow 12 and the roller blind connected thereto would be able to be displaced again. In this case, the slider arrangement 16 and the roller blind can be pushed forward such that the roller blind partially or completely covers the roof opening and thus acts, for example, as a sunshade.

Figure 11:
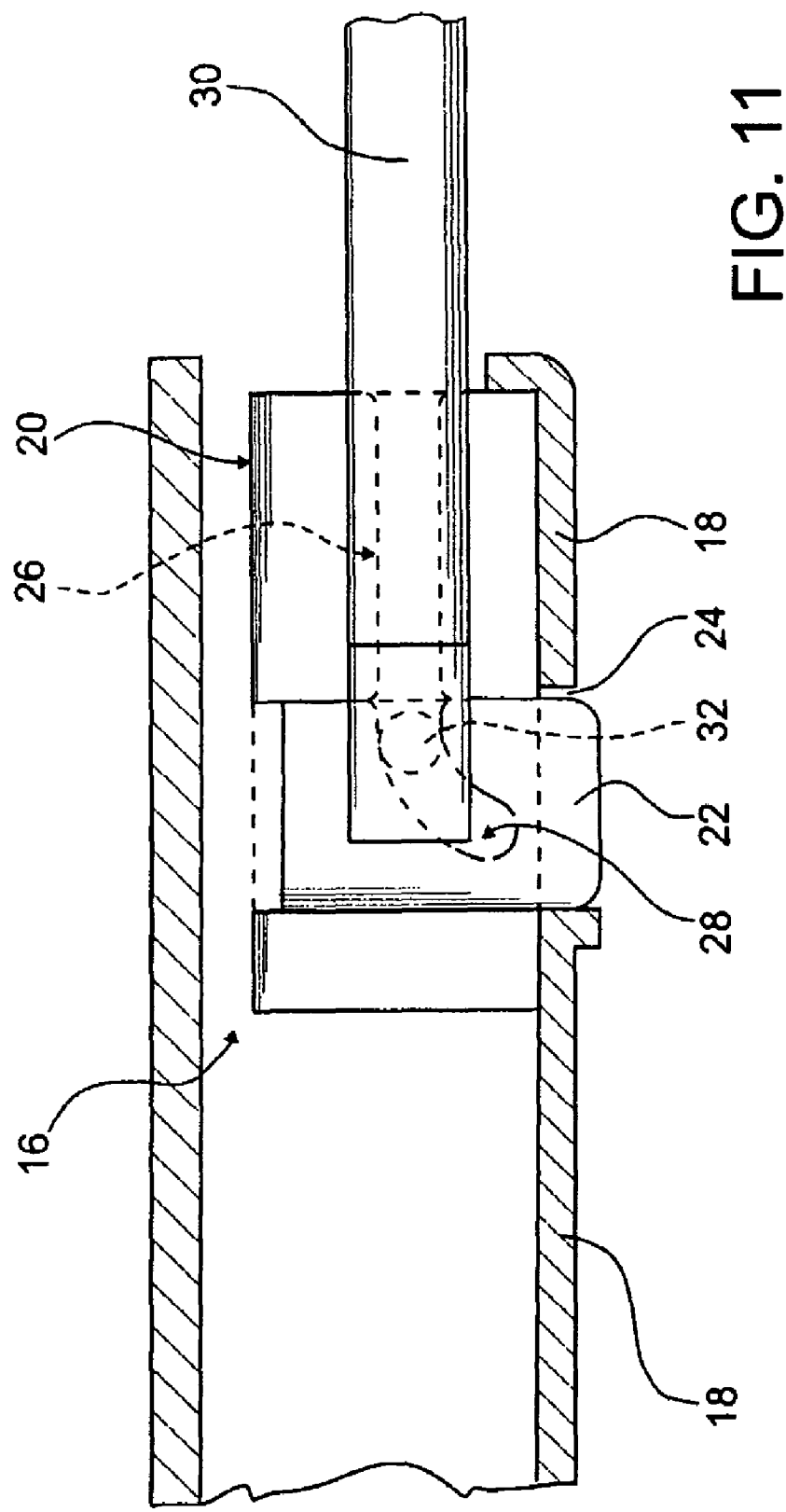
FIG. 11 shows a sectional view through a guide rail and a slider arrangement of the roller blind bow and of the actuating cable, which slider arrangement is arranged movably in said guide rail.

FIG. 11 shows a sectional view of the guide rail 18 and of the slider arrangement 16 guided movably therein. The slider arrangement 16 here comprises the sliding element 20 in which the locking element 22 is movably guided. The sliding element 20 and the locking element 22 each has an interconnected channel 26, 28 in which a projection 32 or pin of the actuating cable 30 can be accommodated. In the illustration in FIG. 11, the locking element 22 is latched in place in the cutout 24 of the guide rail 18 while the projection 32 is pulled out of the depression or the mounting of the channel 28 of the locking element 22 and, in the process, is uncoupled. A spring element can optionally additionally be arranged here, as already described in detail above, said spring element pressing the locking element 22 into the cutout 34 and holding it there.

Although the present invention has been described in the present case with reference to preferred exemplary embodiments, it is not restricted thereto but rather can be modified in diverse ways.

The invention claimed is:

1. An actuating device for a wind deflector device in a motor vehicle, with a roof opening (14) and a roof closure element, wherein the actuating device has at least one actuating cable (30) which can be coupled to a sun-shielding device (10), wherein the actuating cable (30) is designed to actuate the sun-shielding device (10) when it is coupled to the sun-shielding device (10), wherein the actuating cable (30) can be moved in a first direction in which the sun-shielding device (10) uncovers the roof opening (14), and wherein the actuating cable (30) can be decoupled from the sun-shielding device (10) in a predetermined position, and wherein, in the state in which it is decoupled from the sun-shielding device (10), the actuating cable (30) can be moved further in the first direction and, in the process, adjusts the wind deflector device.

2. The actuating device as claimed in claim 1, wherein the sun-shielding device (10) is in each case connected on one or both sides to a slider arrangement (16) which is arranged displaceably in an associated guide rail (18).

3. The actuating device as claimed in claim 2, wherein the actuating cable (30) can be coupled to the slider arrangement (18).

4. The actuating device as claimed in claim 2, wherein a locking element (22) can be latched in place in at least one cutout (24) in the guide rail (18), with, at least one spring element (34) additionally being provided via which the locking element (22) can be moved into the cutout (24).

5. The actuating device as claimed in claim 4, wherein the cutout (24) is arranged in such a manner that the sun-shielding device (10) is located in a position in which it essentially completely uncovers the roof opening (14) when the locking element (22) latches in place into the cutout (24).

6. The actuating device of claim 2, wherein the sun-shielding device (10) is coupled to the actuating cable (30) when the actuating cable (30) is introduced into the slider arrangement (16) and latched in place, and in that the sun-shielding device (10) and the actuating cable (30) are uncoupled if the actuating cable (30) is not latched to the slider arrangement (16) and can be moved out of the latter.

7. The actuating device as claimed in claim 6, wherein the channel (28) in the locking element (22) is of inclined design in such a manner that, when the actuating cable (30) is introduced into the channel (28) in order to be coupled to the sun-shielding device (10), the locking element (22) can be moved out of its position in which it is latched in place.

8. The actuating device of claim 1, wherein the actuating cable (30) is fixedly connected to the wind deflector device when the actuating cable (30) is uncoupled from the sun-shielding device (10) and is moved further in the first direction.

9. The actuating device as claimed in claim 8, wherein the actuating device together with the actuating cable (30) forms an additional support for the wind deflector device for higher adjustment of the wind deflector device.

10. The actuating device of claim 1, wherein the actuating cable (30) can be actuated electrically.

11. The actuating device of claim 1, wherein the sun-shielding device (10) is designed as a roller blind.

\* \* \* \* \*